Patented Feb. 7, 1939

2,146,012

UNITED STATES PATENT OFFICE 2,146,012

SYNTHETIC RESINS AND METHOD OF PRODUCING

John M. De Bell, Longmeadow, Mass., assignor to Hercules Powder Company, Wilmington, Del., a corporation of Delaware No Drawing. Application August 6, 1936, Serial No. 94,689

10 Claims. (Cl. 260—8)

This invention relates to an improvement in synthetic resins and method of producing them.

Heretofore it has been known that synthetic resinous compositions could be produced by reacting an organic polybasic acid and a polyhydric alcohol, and that various modified compositions thereof could be produced by including in the reaction a fatty acid, a resin acid, as rosin, a vegetable or animal oil, or the like, or mixtures thereof.

More particularly, it has been known to produce resinous compositions by reacting, for example, phthalic anhydride, terpinene-maleic anhydride, etc., with glycerol or a glycol and natural resins, in particular, rosin. The rosin heretofore used in such compositions has been ordinary wood or gum rosin, which is characterized by substantially complete solubility in petroleum hydrocarbons, as gasoline, petroleum ether, etc. Such resinous compositions are adapted for various uses and are characterized by solubility in petroleum hydrocarbons, e. g., gasoline and petroleum ether, and in hot alcohol, but not in cold alcohol, and they are compatible with nitrocellulose, e. g., in lacquers.

In accordance with this invention, resinous compositions sharply differentiated from such compositions as the above, and capable of various modified forms, are produced.

From the broad standpoint, this invention relates to a resinous composition produced by reacting an organic polybasic acid, a polyhydric alcohol, and a resin, said resin being hereinafter particularly described, and obtained from resinous wood, e. g., pine wood, and characterized by substantial insolubility in petroleum hydrocarbons, e. g., gasoline, petroleum ether, etc. The polyhydric alcohol/polybasic acid resinous composition produced by the use of said resin, is likewise substantially insoluble in petroleum hydrocarbons, and is thus differentiated from the hitherto known resins of this type discussed above.

More specifically, the polyhydric alcohol/polybasic acid resinous composition in accordance with my invention may be produced in various modified forms by inclusion in the reaction of a modifying agent, as a glyceride oil, a fatty acid, etc.

The method in accordance with this invention resides in effecting the reaction for producing the resinous compositions under any suitable conditions, all as will be exemplified hereinafter.

The resinous compositions in accordance with this invention are adapted for various uses for which prior resins of the type are not well adapted, and are differentiated from the prior resins of the type by the fact of insolubility in petroleum hydrocarbons and incompatibility with vegetable and mineral oils. However, by addition of suitable modifying substances, such as glyceride oils, or the free acids thereof, during the process of preparation of my improved resin, compatibility with vegetable oils may be effected. The resinous compositions according to this invention, will be found to be compatible with nitrocellulose. When used in a coating composition, e. g., a nitrocellulose lacquer, my improved resins are an improvement over the prior art resins containing natural resins, e. g., rosin, especially in the greater durability which they impart to the film.

The uses for which the resinous compositions in accordance with this invention are adaptable are various. Generally speaking, they may be used in insulating varnishes where high gasoline- and oil-resistance and high di-electric strength are desired, in impregnating compositions, and in gasoline- and oil-resistant nitrocellulose lacquers.

In preparing the resinous compositions various organic, polybasic acids, or anhydrides, e. g., phthalic anhydride, terpinene-maleic anhydride, terpinolene-maleic anhydride, and other terpene-maleic acid or anhydride condensates, e. g., abietic acid-maleic anhydride, pinene-maleic anhydride, etc., may be used, and in place of the maleic anhydride I may use succinic acid, tartaric acid, maleic acid, adipic acid, pimelic acid, azelaic acid, sebacic acid, etc. Likewise, various polyhydric alcohols, e. g., glycerol, polyglycerol, glycols, such as ethylene glycol, di-ethylene glycol, tri-ethylene glycol, or glycerol monochlorhydrin, glycerol ethers, as glycerolmono-ethyl ether, glycerylmonophenyl ether, etc., may be used.

The particular resin for use in the preparation of the resinous compositions in accordance with this invention is obtained by the extraction of resinous wood, e. g., pine wood, with a coal tar hydrocarbon, e. g., benzene, toluene, xylene, etc., evaporation of the solvent and volatile, extracted substances, to produce a crude resinous substance, and extraction of such crude resinous substance with a petroleum hydrocarbon, as gasoline or petroleum ether, to remove therefrom any petroleum hydrocarbon-soluble substance present, e. g., wood rosin. The residue remaining after this second extraction comprises a gasoline-insoluble resin, to be used for the preparation of the polyhydric alcohol/polybasic acid resins in accordance with this invention.

This gasoline-insoluble resin is characterized and differentiated from other natural resins, and in particular from ordinary wood or gum rosin, by containing only about 8% of gasoline-soluble matter and having a content of about 98% of naphtha-insoluble matter and about 96% of petroleum ether-insoluble matter all as determined by the standard tests applied to rosin for determination of these values. This resin, as usually prepared, has a melting point, A. S. T. M., drop method, of about 115° C., an acid number of about 100, and a methoxy content of about 3-6%.

This gasoline-insoluble pine resin and methods of preparation thereof, are more fully disclosed and claimed in application for Letters Patent, Serial No. 61,745, filed January 31, 1936, by Lucius C. Hall.

As a specific example of the practical adaptation of the method in accordance with this invention for the production of a resinous composition embodying this invention, 37 parts by weight of phthalic anhydride, 45 parts by weight of glycerol, and 131 parts by weight of the gasoline-insoluble pine wood resin described, are heated together to 290° C. in a vessel equipped with a reflux condenser for 3½ hours. Mechanical agitation facilitates the reaction. The resulting resin is very dark in color, has an acid number of 30 and a melting point (drop method) of 140° C., is completely insoluble in such solvents as gasoline and petroleum ether, and only very slightly soluble in turpentine and benzene, but is readily soluble in solvents such as acetone, ethyl acetate and butylcellosolve. It is incompatible with glyceride oils on heating, and is wholly resistant to mineral oils and greases.

As a further example, 50 parts by weight of terpinene-maleic anhydride, 45 parts by weight of glycerol, and 131 parts by weight of the gasoline-insoluble pine wood resin described are heated under a reflux condenser to 230° C. for 7 hours. The resulting product shows a high resistance to gasoline, petroleum ether, and glyceride or mineral oils and greases.

Where it is desired to produce a modified resin product, the desired modifying substance may be added to the original ingredients before carrying out the reaction, or may be added during the process of heating the original ingredients. Thus, where it is desired to produce a composition compatible with glyceride oils, e. g., linseed oil, such may be accomplished by adding linseed oil, or linseed oil fatty acids and an equivalent amount of glycerol, to the ingredients indicated above, and then completing the reaction by heating. Modifiers which will give compositions having varying properties adapted for various uses are, for example, higher monobasic or polybasic fatty acids, vegetables oils, non-drying or drying oils or the fatty acids thereof, glycerides or equivalently the fatty acids thereof, etc.

It will be understood that this invention contemplates broadly a resinous composition produced by reaction of an organic, polybasic acid, a polyhydric alcohol, and the particular petroleum hydrocarbon-insoluble pine wood resin described and characterized above, with or without the inclusion of a modifying agent or agents.

What I claim and desire to protect by Letters Patent is:

1. A synthetic resin comprising a reaction product of a polyhydric alcohol, an organic polycarboxylic acid, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

2. A synthetic resin comprising a reaction product of a polyhydric alcohol, an organic polycarboxylic acid, a modifying agent from the group consisting of glyceride oils and higher fatty acids and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

3. A synthetic resin comprising a reaction product of a polyhydric alcohol, an organic polycarboxylic acid, a monobasic higher fatty acid, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

4. A synthetic resin comprising a reaction product of a polyhydric alcohol, an organic polycarboxylic acid, a higher fatty acid glyceride, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

5. A synthetic resin comprising a reaction product of a polyhydric alcohol, an organic polycarboxylic acid, an unsaturated higher fatty acid glyceride, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

6. A synthetic resin comprising a reaction product of a polyhydric alcohol, an organic polycarboxylic acid, an unsaturated monobasic higher fatty acid, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

7. A synthetic resin comprising a reaction product of a polyhydric alcohol, phthalic anhydride, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

8. A synthetic resin comprising a reaction product of a polyhydric alcohol, a terpene-maleic anhydride condensation product, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

9. The method of producing a synthetic resin which comprises reacting a polyhydric alcohol, an organic polycarboxylic acid, and a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

10. The method of producing a synthetic resin which comprises reacting a polyhydric alcohol, an organic polycarboxylic acid, a modifying agent from the group consisting of glyceride oils and higher fatty acids together with a petroleum hydrocarbon-insoluble resin obtained by extraction of pine wood with a coal tar hydrocarbon solvent, evaporation of the volatile constituents of said extract, and extraction of the non-volatile constituents thereof with a light petroleum hydrocarbon solvent.

JOHN M. DE BELL.